(12) United States Patent
Shiu et al.

(10) Patent No.: US 8,984,227 B2
(45) Date of Patent: Mar. 17, 2015

(54) ADVANCED COARSE-GRAINED CACHE POWER MANAGEMENT

(71) Applicant: Apple Inc., Cupertino, CA (US)

(72) Inventors: Shinye Shiu, Los Altos, CA (US);
Sukalpa Biswas, Fremont, CA (US);
Wolfgang H. Klingauf, San Jose, CA (US); Rong Zhang Hu, Saratoga, CA (US)

(73) Assignee: Apple Inc., Cupertino, CA (US)

(*) Notice: Subject to any disclaimer, the term of this patent is extended or adjusted under 35 U.S.C. 154(b) by 158 days.

(21) Appl. No.: 13/855,174

(22) Filed: Apr. 2, 2013

(65) Prior Publication Data

US 2014/0297959 A1    Oct. 2, 2014

(51) Int. Cl.
*G06F 12/02* (2006.01)
*G06F 1/32* (2006.01)
*G06F 12/08* (2006.01)
*G06F 12/12* (2006.01)

(52) U.S. Cl.
CPC ......... *G06F 1/3275* (2013.01); *G06F 12/0864* (2013.01); *G06F 12/123* (2013.01); *G06F 2212/1028* (2013.01); *G06F 2212/601* (2013.01)
USPC ........... 711/128; 711/154; 711/156; 711/170; 711/173; 713/324

(58) Field of Classification Search
USPC ........... 711/128, 154, 156, 170, 173; 713/324
See application file for complete search history.

(56) References Cited

U.S. PATENT DOCUMENTS

| | | | |
|---|---|---|---|
| 5,512,921 A | 4/1996 | Mital et al. | |
| 5,715,426 A * | 2/1998 | Takahashi et al. | 711/128 |
| 5,761,715 A * | 6/1998 | Takahashi | 711/128 |
| 5,961,617 A | 10/1999 | Tsang | |
| 6,799,250 B2 * | 9/2004 | Hamaya | 711/128 |
| 6,944,714 B2 * | 9/2005 | Lesarte et al. | 711/128 |
| 7,042,461 B2 | 5/2006 | Cui | |
| 7,043,647 B2 * | 5/2006 | Hansen et al. | 713/320 |
| 7,127,560 B2 | 10/2006 | Cohen et al. | |
| 7,430,642 B2 * | 9/2008 | Moyer | 711/141 |
| 7,437,513 B2 * | 10/2008 | Saida et al. | 711/128 |
| 7,472,302 B2 | 12/2008 | Hu et al. | |
| 7,502,887 B2 * | 3/2009 | Tanaka et al. | 711/128 |
| 7,636,812 B2 * | 12/2009 | Kaneko | 711/128 |

(Continued)

OTHER PUBLICATIONS

Han et al.; "Using Checksum to Reduce Power Consumption of Display Systems for Low-Motion Content;" Proc. IEEE International Conference on Computer Design, Oct. 4-7, 2009, Lake Tahoe, CA; pp. 47-53.

(Continued)

*Primary Examiner* — Stephen Elmore
(74) *Attorney, Agent, or Firm* — Rory D. Rankin; Meyertons, Hood, Kivlin, Kowert & Goetzel, P.C.

(57) ABSTRACT

Methods and apparatuses for reducing power consumption of a system cache within a memory controller. The system cache includes multiple ways, and each way is powered independently of the other ways. A target active way count is maintained and the system cache attempts to keep the number of currently active ways equal to the target active way count. The bandwidth and allocation intention of the system cache is monitored. Based on these characteristics, the system cache adjusts the target active way count up or down, which then causes the number of currently active ways to rise or fall in response to the adjustment to the target active way count.

20 Claims, 10 Drawing Sheets

(56) References Cited

U.S. PATENT DOCUMENTS

| | | | |
|---|---|---|---|
| 7,904,658 B2* | 3/2011 | Abadeer et al. | 711/128 |
| 8,103,894 B2 | 1/2012 | Balakrishnan et al. | |
| 8,156,357 B2 | 4/2012 | Zhang et al. | |
| 8,285,936 B2 | 10/2012 | Roberts et al. | |
| 8,335,122 B2* | 12/2012 | Dreslinski et al. | 365/226 |
| 8,412,971 B2* | 4/2013 | Branover et al. | 713/324 |
| 8,832,485 B2* | 9/2014 | Branover et al. | 713/324 |
| 2002/0156978 A1* | 10/2002 | Hamaya | 711/128 |
| 2003/0156472 A1* | 8/2003 | Satou et al. | 365/200 |
| 2004/0024968 A1* | 2/2004 | Lesartre et al. | 711/128 |
| 2005/0086435 A1* | 4/2005 | Todoroki | 711/128 |
| 2005/0246499 A1* | 11/2005 | Saida et al. | 711/128 |
| 2007/0043965 A1* | 2/2007 | Mandelblat et al. | 713/324 |
| 2007/0124538 A1* | 5/2007 | Abadeer et al. | 711/128 |
| 2007/0136530 A1* | 6/2007 | Tanaka | 711/128 |
| 2007/0288776 A1 | 12/2007 | DeMent et al. | |
| 2008/0040547 A1* | 2/2008 | Abadeer et al. | 711/128 |
| 2008/0244181 A1* | 10/2008 | Walz et al. | 711/121 |
| 2008/0313482 A1 | 12/2008 | Karlapalem et al. | |
| 2009/0119487 A1* | 5/2009 | Hosoda | 712/205 |
| 2009/0235028 A1* | 9/2009 | Kaneko | 711/128 |
| 2010/0122100 A1 | 5/2010 | Strumper | |
| 2010/0191990 A1* | 7/2010 | Zhang et al. | 713/320 |
| 2011/0208916 A1* | 8/2011 | Saito | 711/130 |
| 2011/0283124 A1 | 11/2011 | Branover et al. | |
| 2012/0159074 A1 | 6/2012 | Sodhi et al. | |
| 2012/0314833 A1 | 12/2012 | Venkatasubramanian et al. | |
| 2013/0036270 A1* | 2/2013 | Dreslinski et al. | 711/128 |
| 2013/0080813 A1* | 3/2013 | Tarui et al. | 713/324 |
| 2013/0111121 A1* | 5/2013 | Ananthakrishnan et al. | 711/105 |
| 2013/0246818 A1* | 9/2013 | Nomura et al. | 713/320 |
| 2014/0052922 A1* | 2/2014 | Moyer et al. | 711/128 |
| 2014/0089590 A1* | 3/2014 | Biswas et al. | 711/128 |
| 2014/0181407 A1* | 6/2014 | Crum et al. | 711/128 |

OTHER PUBLICATIONS

U.S. Appl. No. 13/850,548, filed Mar. 26, 2013, entitled "Compressed Frame Writeback and Read for Display in Idle Screen on Case," inventors Brijesh Tripathi, Peter Holland, and Albert Kuo.

U.S. Appl. No. 13/890,306, filed May 9, 2013, entitled "Memory Power Savings in Idle Display Case," inventors Sukalpa Biswas, Shinye Shiu, Cyril de la Cropte de Chanterac, Manu Gulati, Pulkit Desai, and Rang Zhang Hu.

U.S. Appl. No. 13/850,565, filed Mar. 26, 2013, entitled "Mechanism to Detect Idle Screen On," inventors Brijesh Tripathi, Peter Holland, and Albert Kuo.

Ke Meng and Russ Joseph, "Process Variation Aware Cache Leakage Management", Oct. 4-6, 2006, Proceedings of the 2006 International Symposium on Low Power Electronics and Design (ISLPED '06) ACM, New York, NY, USA; pp. 262-267.

Albonesi, D.H., "Selective Cache Ways: On-Demand Cache Resource Allocation", May 2000, Journal of Instruction-Level Parallelism 2 (2000) 1-6; pp. 1-22.

U.S. Appl. No. 13/866,282, filed Apr. 19, 2013, entitled "A Cache Allocation Scheme Optimized for Browsing Applications," inventor Sukalpa Biswas, Wolfgang H. Klingauf, Rong Zhang Hu, and Shinye Shiu.

U.S. Appl. No. 13/629,563, filed Sep. 27, 2012, entitled "System Cache with Coarse Grain Power Management," inventors Sukalpa Biswas, Shinye Shiu, and Rong Zhang Hu.

U.S. Appl. No. 13/855,189, filed Apr. 2, 2013, entitled "Advanced Fine-Grained Cache Power Management," inventors Wolfgang H. Klingauf, Rong Zhang Hu, Sukalpa Biswas, and Shinye Shiu.

* cited by examiner

ADVANCED COARSE-GRAINED CACHE POWER MANAGEMENT

BACKGROUND

1. Field of the Invention

The present invention relates generally to data caches, and in particular to methods and mechanisms for dynamically sizing a system cache located in a memory controller.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the processor.

Conventional caches are typically coupled to or nearby a processor and store data that is frequently accessed by the processor to reduce latency. Caches tend to consume large amounts of power, which is a valuable commodity in mobile electronic devices. Therefore, techniques to decrease the power consumption of caches are desired for reducing the overall power consumption of ICs and other electronic devices.

SUMMARY

Systems, memory controllers, caches, and methods for reducing the power consumption of a system cache are disclosed.

In one embodiment, the system cache may have a multi-way set associative configuration. Each way of the multi-way system cache may be powered separately from the other ways, allowing individual ways to be powered up or powered down during the operation of the system cache. The system cache may include a cache control unit, and the cache control unit may include logic to track various metrics related to the performance of the system cache.

In one embodiment, the cache control unit may maintain a target active way count, which specifies the desired number of active ways in the system cache. The cache control unit may also track the replacement and allocation failure count of requests and the hit count of requests that are received by the system cache. In addition, multiple programmable threshold values may be compared to these metrics. Based on the relationship between these metrics and the various threshold values, the target active way count may be adjusted. The cache control unit may detect a change to the target active way count, and then the cache control unit may increase or decrease the number of currently active ways in the system cache to match the change to the target active way count.

In one embodiment, the cache control unit may utilize a low-pass filter to avoid oscillation of ways powering up and down. To avoid oscillation, when a given way is powered down, a timer may be started. The cache control unit may prevent any of the ways from being powered up until the timer has expired. Similarly, when a given way is powered up, the timer may be started, and the cache control unit may prevent any of the ways from being powered down until the timer has expired.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
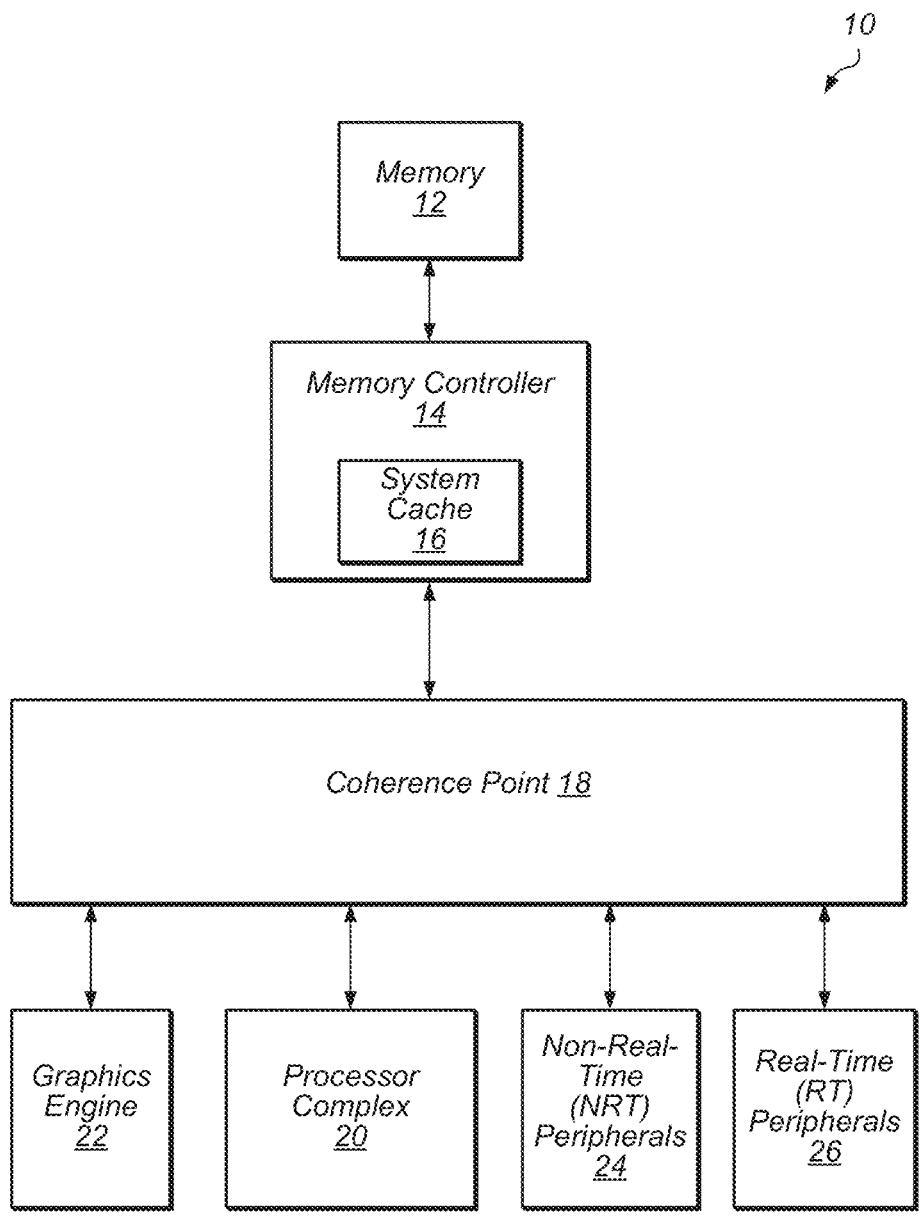
FIG. 1 illustrates one embodiment of a portion of an electronic device.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include system cache 16 for storing data retrieved from or intended for memory 12. System cache 16 may be configured to process memory requests from multiple requesting agents. One or more requesting agents may be included within any of the devices shown connected to coherence point 18. In one embodiment, cache lines may be allocated in system cache 16 with either a sticky state or a non-sticky state. When deciding which data to retain in system cache 16, system cache 16 may base the decisions on the sticky status of the cache lines. As a result of using the sticky allocation for data that is going to be reused, the number of accesses that are made to memory 12 may be reduced, which reduces latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS). Each of the CPUs may include a level one (L1) cache (not shown), and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
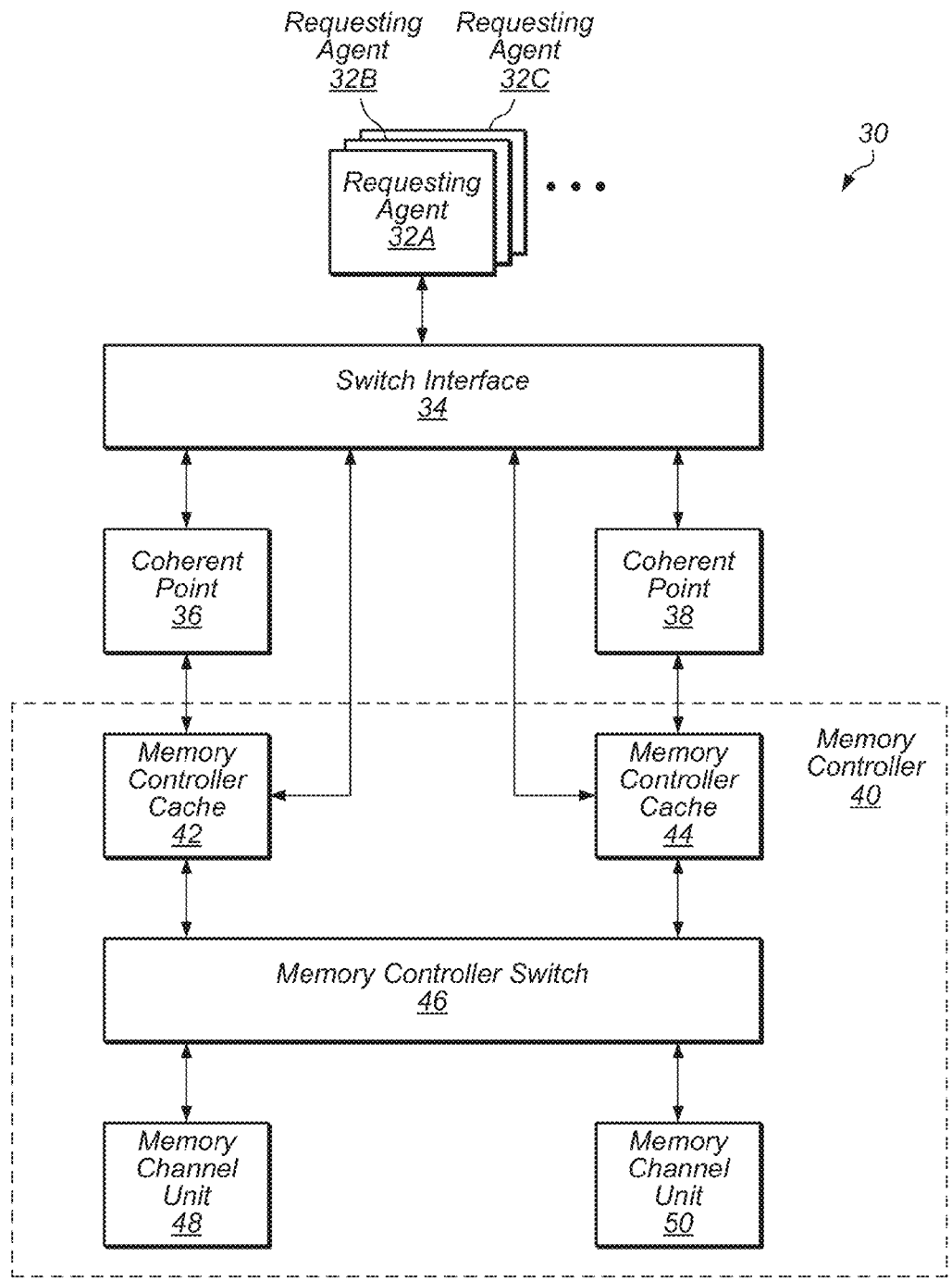
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC) or an apparatus. It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherence point 36 and memory requests that reference the address space of cache 44 may be routed by switch interface 34 to cache 44 via coherence point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches. In other embodiments, memory controller 40 may include other numbers of memory controller caches. For example, in another embodiment, memory controller 40 may include four separate memory controller caches.

Memory controller caches 42 and 44 may be configured to maintain a sticky status for each cache line stored in the caches. The sticky status may be implemented via a sticky state, sticky flag, sticky bit, sticky tag, or other similar field. In one embodiment, a tag memory may be utilized to store tag entries that correspond to cache lines stored in a data memory. The tag entries may include multiple fields including a sticky status field and a group ID field. The group ID field may be used to identify the dataflow source of the request which caused the cache line to be allocated in the cache.

Memory controller switch 46 may route traffic between memory controller caches 42 and 44 and memory channel units 48 and 50. There may be one memory channel unit 48 and 50 for each memory channel included in a given embodiment, and other embodiments may include one channel or more than two channels. The memory channel units 48 and 50 may be configured to schedule memory operations to be transmitted on the memory channel. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
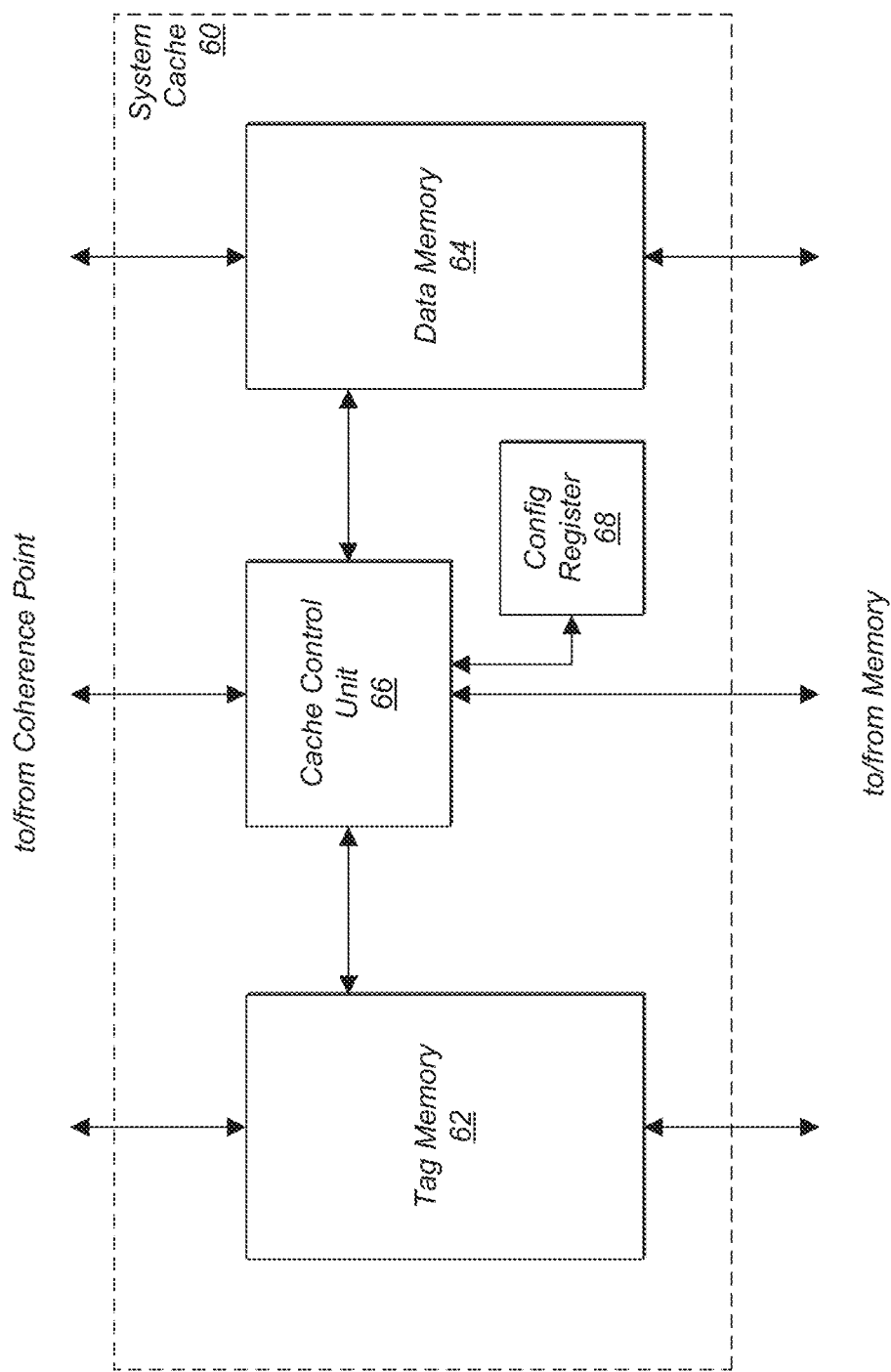
FIG. 3 is a block diagram illustrating one embodiment of a system cache.

Referring now to FIG. 3, a block diagram of one embodiment of a system cache is shown. In one embodiment, system cache 60 may include tag memory 62, data memory 64, cache control unit 66, and configuration register 68. It is noted that system cache 60 may also include other components and logic not shown in FIG. 3. For example, in other embodiments, system cache 60 may include arbitration circuitry to arbitrate among requests. It is to be understood that the system cache architecture shown in FIG. 3 is merely one possible architecture that may be implemented. In other embodiments, other system cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways. Cache control unit 66 is coupled to tag memory 62 and data memory 64, and cache control unit 66 may be configured to receive various control data related to the received transactions and to respond to the received control data. It is noted that although cache control unit 66 is shown in FIG. 3 as a single unit, in other embodiments, cache control unit 66 may be split up into multiple units within system cache 60. Configuration register 68 may include configuration information for the various group IDs associated with the data stored in system cache 60. Configuration register 68 may be programmed by software commands sent to cache control unit 66 from the OS and/or various requesting agents.

Configuration register 68 is representative of any number of configuration registers which may be utilized as part of system cache 60. For example, in one embodiment, there may be a separate configuration register 68 for each group identifier (ID) assigned by the OS to use system cache 60. In this embodiment, each configuration register may define a status, quota, and replacement policy for a respective group ID. The status may be set to either active or inactive by a software command sent to system cache 60. When the status is set to inactive, this may trigger the cache control unit 66 to invalidate all of the lines that are allocated for this particular group ID. The quota may be set to limit the amount of lines that may be allocated for the respective group ID in system cache 60.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from system cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above. The selected tag entry may store the tags that correspond to the set of cache line storage locations in system cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

System cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in system cache 60, at which the corresponding cache line would be stored. In one embodiment, system cache 60 may be associative, in which a given address maps to two or more cache line storage locations in the data memory 64 that may be eligible to store the cache line. System cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by system cache 60. The transaction may be a write to memory, for example. The transaction may also be a read completion (with data) provided from the memory (not shown) in response to a read previously received from a requesting agent and targeting the memory.

In one embodiment, each transaction received by system cache 60 from a requesting agent may include a group ID number, a cache allocation hint, and one or more other attributes. The cache allocation hint may be utilized by system cache 60 and cache control unit 66 to determine how to allocate a cache line for the transaction if the transaction misses in the system cache 60. If a new cache line is allocated for the transaction, the group ID number may be stored in a corresponding entry in tag memory 62.

Tag memory 62 may be configured to store various tags for the cache lines cached in the system cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

Figure 4:
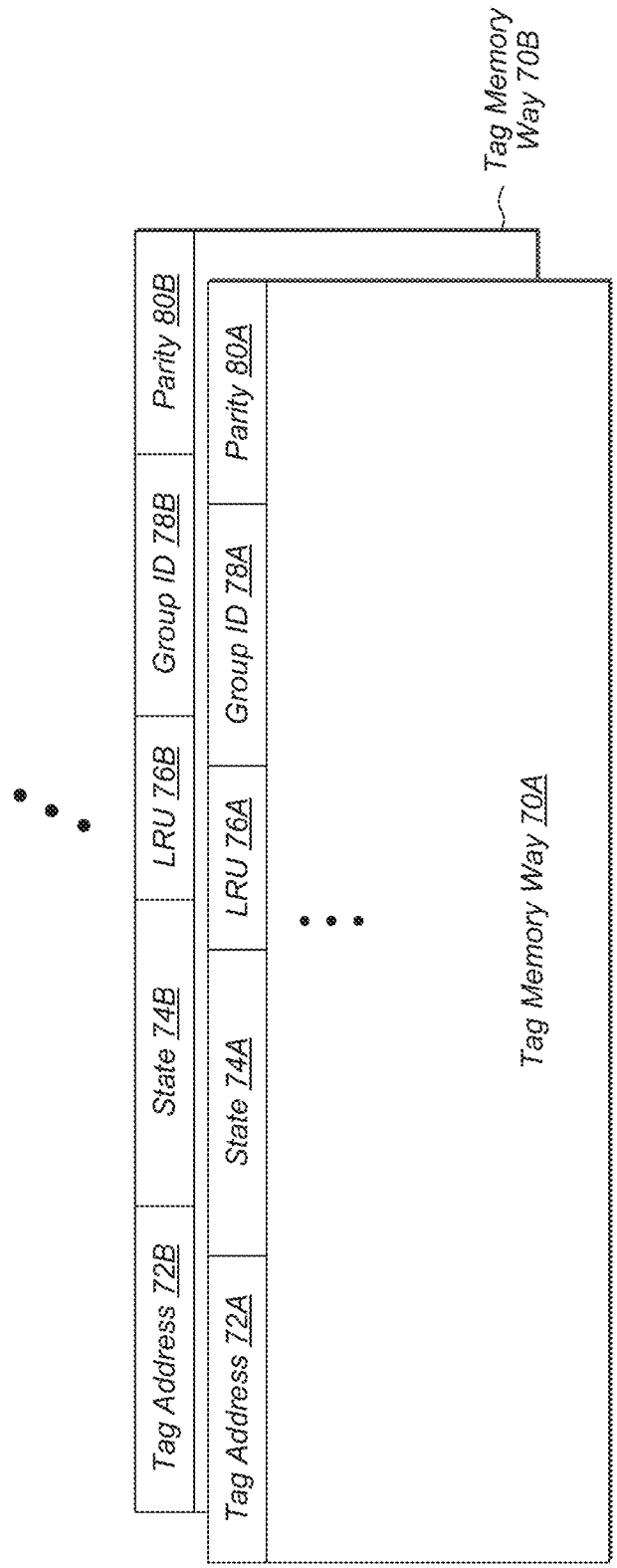
FIG. 4 is a block diagram illustrating one embodiment of a pair of tag memory ways.

Turning now to FIG. 4, a block diagram of one embodiment of a pair of tag memory ways is shown. Tag memory ways 70A-B are representative of any number of ways that may be included within a tag memory, such as tag memory 62 (of FIG. 3). In one embodiment, each tag memory way 70A-B may include any number of entries for data corresponding to cache lines stored in a corresponding data memory way. A sample entry is shown in each of tag memory ways 70A-B.

Each tag entry may include the tag portion of the address (tag address 72A-B), to be compared against input request addresses. Tag address 72A-B may include the most significant bits of the physical address field for a received transaction. The number of bits used for the tag address 72 field may vary depending on the embodiment. State 74A-B may represent the state of the corresponding cache line stored in the data memory. There may be multiple different values which the state 74A-B may take, depending on the embodiment. For example, in one embodiment, the different possible states may include the following: invalid, clean, dirty, data pending, sticky clean, sticky dirty, and LRU dirty. The requesting agent may also provide a hint as to the sticky status of the transaction. The data pending state may indicate that data for the cache line is currently being fetched from memory. Any entries with an invalid state may be chosen as the best candidates for replacement when a new line is allocated in the system cache. The next best candidates for replacement may be any entries with the LRU dirty state. It is noted that in another embodiment, each entry in tag memory ways 70A-B may include a sticky flag or sticky bit, and this may indicate if the entry is sticky, rather than the state field.

The requesting agent responsible for generating the transaction may convey a hint with the transaction that determines the state that will be assigned to the corresponding tag entry. This hint may determine if the data associated with the transaction is stored in the system cache. For example, in one scenario, for a specific transaction, the hint accompanying the transaction may indicate that the transaction is sticky. If the transaction is accompanied by a sticky hint, and the transaction misses in the system cache, then the data may be retrieved from memory and allocated in the system cache with a tag state 74 set to sticky. Setting the state to sticky indicates that this data will "stick" in the cache and will not be removed by the system cache. If data for another sticky transaction from a different group ID were attempting to allocate space in the system cache, this data would be prevented from replacing sticky lines from other group IDs.

The LRU 76A-B field may store a value indicating a usage status associated with the corresponding line. This LRU 76A-B field may indicate how recently and/or how often the corresponding line has been accessed, and the number of bits in this field may vary depending on the embodiment. The group ID 78A-B field may store a group ID identifying the group that owns the corresponding line in the data memory of the system cache. The group may refer to a specific dataflow that is being used by one or more requesting agents. It is noted that a "group ID" may also be referred to as a "dataset ID" in some embodiments. Depending on the embodiment, various numbers of bits may be utilized to represent the group ID.

In some cases, a single group ID may be shared by two or more requesting agents. For example, page translation tables may be utilized by multiple requesting agents, and any transactions referencing the page translation tables may be assigned a common group ID. This common group ID may span multiple requesting agents. Also, each requesting agent may use multiple separate group IDs for the different dataflows being utilized by the requesting agent. A group ID may be assigned to a dataflow for one or more requesting agents by the OS of the host electronic device. In one embodiment, a device driver may request a group ID from the OS. As part of the request, the device driver may identify which type of data the request corresponds to. Then, in response to receiving the request from the device driver, the OS may specify the group ID to be used for this request based on the type of data being accessed.

Each group represented by a group ID may be assigned a specific quota of cache lines in the system cache. When a group reaches the total amount of its quota, the group may not be able to allocate any more lines in the system cache. Instead, the specific group may replace its existing lines in the cache with the newly allocated lines. In one embodiment, the first lines that are replaced for a given group ID may be the lines which have an invalid state followed by the lines which have a LRU dirty state.

The parity 80A-B field may include any number of parity bits to provide an indication of the accuracy of the data in the entire entry across all of the fields. It is noted that in other embodiments, each entry of tag memory ways 70A-B may include one or more additional fields of information not shown in FIG. 4. For example, information about how recently the cache line was replaced may also be stored in each tag of tag memory ways 70A-B. Also, in other embodiments, tag memory ways 70A-B may be structured in any other suitable manner.

Figure 5:
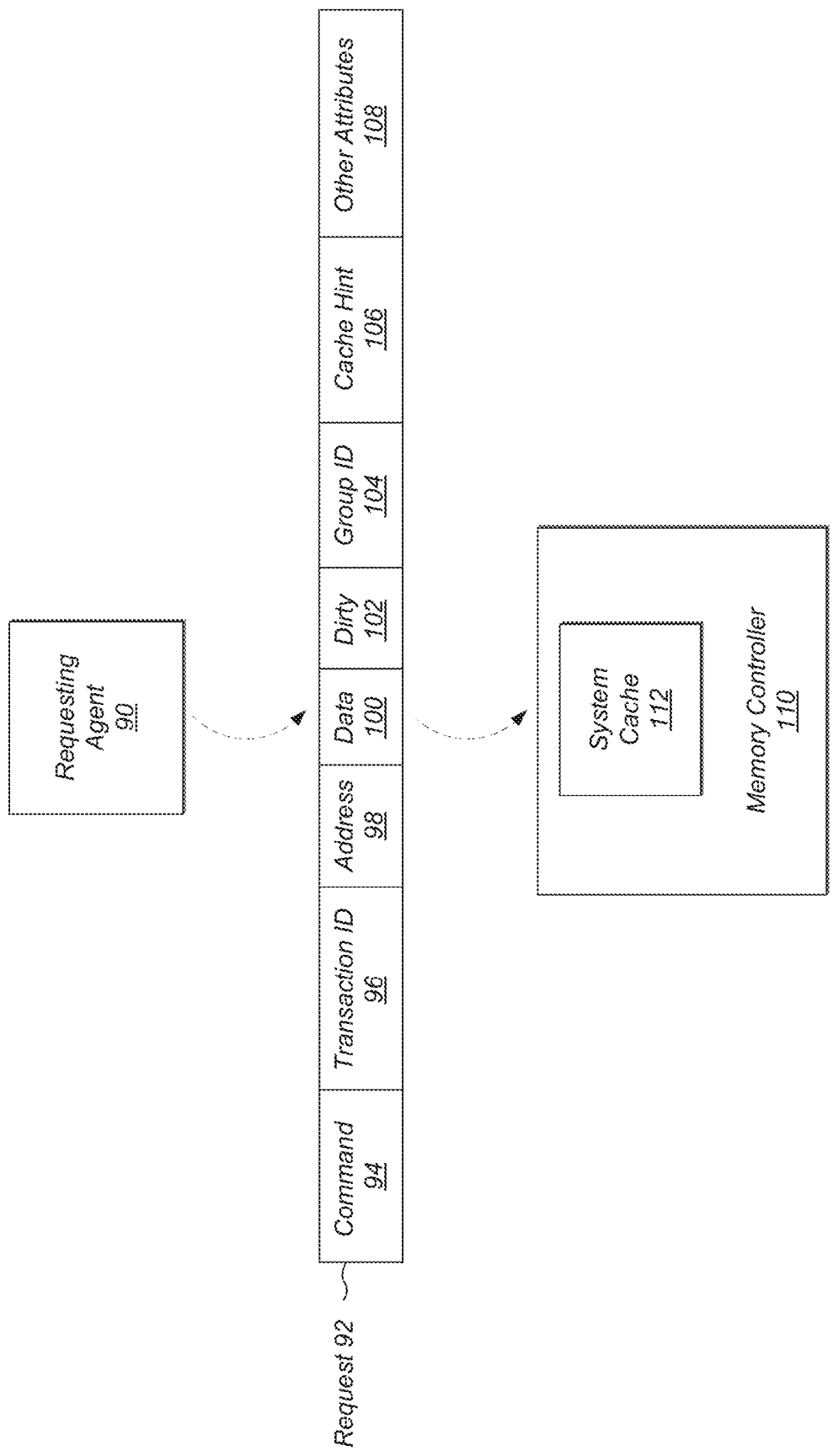
FIG. 5 illustrates one embodiment of a requesting agent conveying a request to a system cache.

Referring now to FIG. 5, one embodiment of a requesting agent conveying a request to a system cache is shown. Requesting agent 90 is representative of any number and type of requesting agents. Although requesting agent 90 is shown as sending request 92 directly to memory controller 110, it is noted that one or more components (e.g., coherent point, switch) may be located between requesting agent 90 and memory controller 110.

Each request sent from requesting agent 90 may include a plurality of fields. For example, in one embodiment, request 92 may include command 94, which indicates the type of request (e.g., read, write) being sent. Request 92 may also include transaction ID 96, which indicates the transaction ID associated with request 92. Transaction ID 96 may uniquely identify the request for requesting agent 90. It is noted that transaction ID 96 may also be referred to as a "request ID". In addition, in other embodiments, request 92 may also include an agent ID to identify the requesting agent. Request 92 may also include the address 98 and data 100 fields to identify the memory address and data (for a write request), respectively.

Request 92 may also include a dirty status indicator 102 to indicate if the write data is dirty. Request 92 may also include a group ID 104 to identify the group ID of request 92. Cache hint 106 may determine how request 92 is treated by system cache 112. In other embodiments, cache hint 106 may be referred to as an "allocation hint", "sticky hint", "sticky flag", "sticky bit", or "sticky attribute". It is noted that cache hint 106 may indicate the sticky status of request 92 and may also include other information regarding how request 92 should be treated by system cache 112. Other attributes 108 are representative of any number and type of additional attributes (e.g., coherency, QoS attribute, size of the request, requestor ID, speculative status) which may be part of request 92. It is noted that in other embodiments, request 92 may be structured differently, with one or more additional fields not shown in FIG. 5 and/or one or more of the fields shown omitted.

Although system cache 112 is shown as a single unit, it should be understood that in other embodiments, system cache 112 may be split up into two or more separate units. For example, in another embodiment, memory controller 110 may include two channels and system cache 112 may be split up into two separate physical system caches. In this embodiment, the two separate physical system caches may be managed as one logical system cache.

Figure 6:
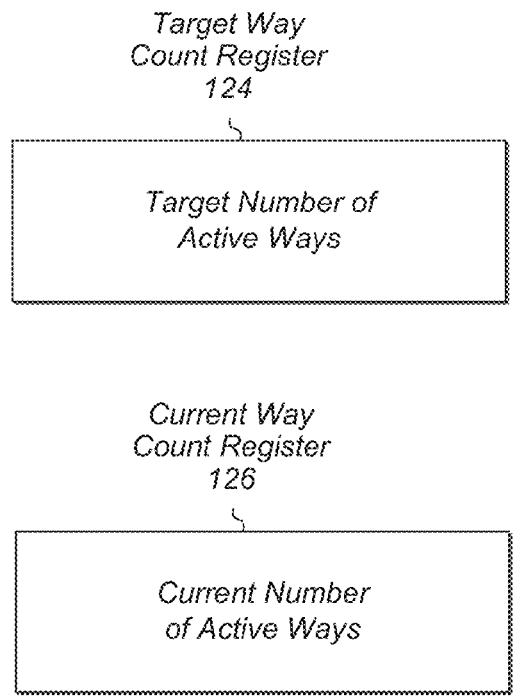
FIG. 6 illustrates one embodiment of a set of configuration registers.

Turning now to FIG. 6, one embodiment of a set of power management configuration registers for a system cache is shown. These registers may be utilized by a cache control unit (not shown) for managing the enabling and disabling of power to individual ways of a multi-way system cache.

Target way count register 124 may also be utilized by the cache control unit for determining how to manage the power supplied to the individual ways. The value stored in register 124 may specify a target number of active ways. Register 124 may be controlled by the cache control unit, and the cache control unit may attempt to make the current number of active ways equal to the value stored in register 124. Current way count register 126 may store the current number of active ways. Registers 124 and 126 may include any number of bits, depending on the embodiment.

The cache control unit may adjust the value in target way count register 124 based on a variety of detected conditions. For example, in one embodiment, the value stored in register 124 may be increased if the replacement and allocation failure count is greater than the hit count by more than a power-up threshold. The replacement and allocation failure count includes requests that cause cache line replacements because there are no more active ways, requests that fail to allocate because all of the currently active ways are sticky, and requests that fail to allocate because there is not an active way.

In various embodiments, allocation fails may be tracked or otherwise monitored on a periodic basis. For example, allocation fails within a given window of time or sampling period (e.g., 1 ms, 1 μs, or otherwise) may be monitored. In various embodiments, these sampling periods are programmable. In some embodiments, rolling averages may be determined based on multiple sampling periods. In other embodiments, cache accesses themselves during a given sampling period may be used as an indication or proxy for allocation fails where such information is not directly available. Other techniques may include monitoring bandwidth more generally as an indicator for whether cache ways should or should not be disabled. While cache allocation fails may provide a better indicator, other less accurate techniques (such as bandwidth or cache accesses) may be used when cache allocation fail information is not readily available. Numerous such embodiments are possible and are contemplated.

The target way count value stored in register 124 may be decreased if the replacement and allocation failure count is less than a first power-down threshold. The target way count value may also be decreased if the hit count is greater than the replacement and allocation failure count by more than a second power-down threshold.

Figure 7:
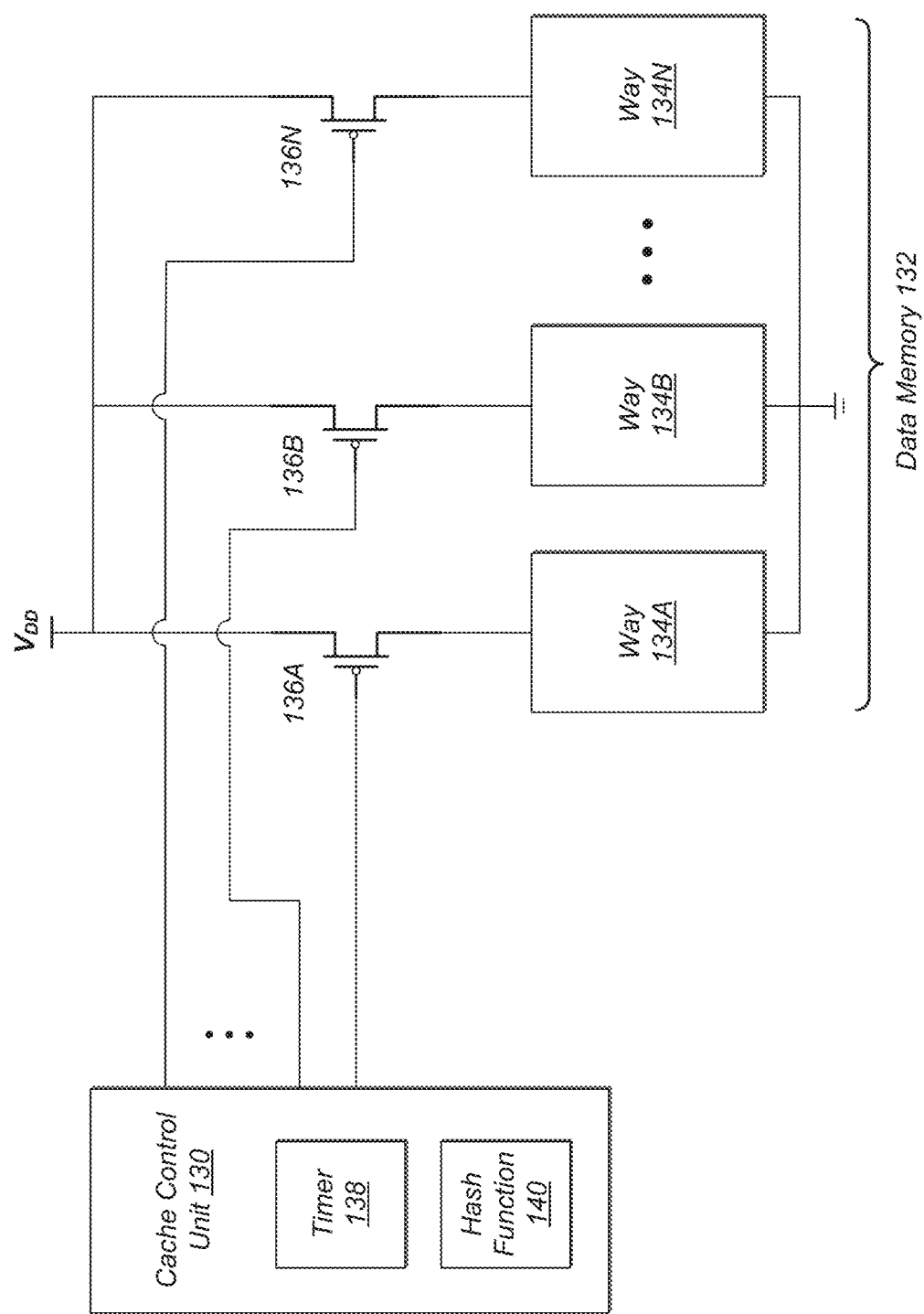
FIG. 7 is a block diagram illustrating one embodiment of a cache control unit controlling power supplies for ways of a system cache.

Referring now to FIG. 7, a block diagram of one embodiment of independently controlled power switches coupled to a system cache data memory is shown. Data memory 132 includes ways 134A, 134B, and 134N, which are representative of any number of ways of data memory 132. For example, in one embodiment, data memory 132 may include 16 ways. In other embodiments, data memory 132 may include other numbers of ways. It is also noted that in one embodiment, data memory 132 may be a static random-access memory (SRAM). In other embodiments, data memory 132 may be other types of memory.

In one embodiment, cache control unit 130 may track a replacement and allocation failure count and a hit count for received requests. The replacement and allocation failure count includes any requests that replace existing cache lines or any requests that fail to allocate in the system cache. The hit count includes any requests that hit in the system cache. A moving average of the replacement and allocation failure count may be calculated over a programmable period of time. Similarly, a moving average of the hit count may be calculated over a programmable period of time.

In various embodiments, the count values may be compared to each other and to one or more thresholds. If the replacement and allocation failure count is greater than the hit count by a power-up threshold, then the target active way count may be increased. If the replacement and allocation failure count is less than a first power-down threshold, then the target active way count may be decreased. If the hit count is greater than the replacement and allocation failure count by more than a second power-down threshold, then the target active way count may decreased. Cache control unit 130 may detect a change to the target active way count, and then unit 130 may activate or inactive one or more ways of ways 134A-N to make the count of currently active ways match the target active way count. In one embodiment, switches 136A, 136B, and 136N may control whether power ($V_{DD}$) is provided to ways 134A, 134B, and 134N, respectively, and each of these switches may be independently controlled by cache control unit 130.

It is noted that a tag memory (not shown) may also include multiple ways, and each way of the tag memory may be powered independently by cache control unit 130. Each way of the tag memory may store tag entries that correspond to the cache lines stored in a way of the data memory. Therefore, when a specific way of the data memory is powered down, the corresponding way of the tag memory may also be powered down by cache control unit 130.

Cache control unit 130 also includes timer 138, which may be utilized to apply a low-pass filter to prevent the number of currently active ways from oscillating between adjacent numbers. When an inactive way is powered up, timer 138 may be started and run for a programmable amount of time until expiring. While timer 138 is running, cache control unit 130 may prevent any active way of ways 134A-N from being powered down. Unit 130 may permit another inactive way to be powered up while timer 138 is running since timer 138 was started due to an inactive way being powered up.

In one embodiment, there may be a status bit (not shown) associated with timer 138 that indicates whether timer 138 is running due to an inactive way being powered up or an active way being powered down. For example, the status bit may be set to zero to indicate there was a power-up operation and one to indicate there was a power-down operation. In a similar manner, when an active way is powered down, timer 138 may be started and run for a programmable amount of time until expiring. While timer 138 is running, cache control unit 130 may prevent any inactive way of ways 134A-N from being powered up. However, unit 130 may permit another active way to be powered down while timer 138 is running since timer 138 was started due to an active way being powered down. While only one timer 138 is shown in FIG. 7, it is noted that other embodiments may include more than one timer. For example, in another embodiment, there may be a first timer that is started after an inactive way is powered up and a second timer that is started after an active way is powered down.

Cache control unit 130 also includes hash function 140 for spacing out the way being powered up to reduce the probability of supply noise affecting an active way. Powering up way by way dynamically can introduce noise on the power supply. Therefore, in order to minimize the effect of noise on the operation of the system cache, hash function 140 may be used to space out the way being powered up to reduce the possibility of supply noise on an active way. In one embodiment, hash function 140 may hash the way ID of ways 134A-N so as to randomize the selection of ways. By using hash function 140, cache control unit 130 may ensure that selecting an individual way from ways 134A-N for activation is performed in a random manner to minimize the supply noise.

Figure 8:
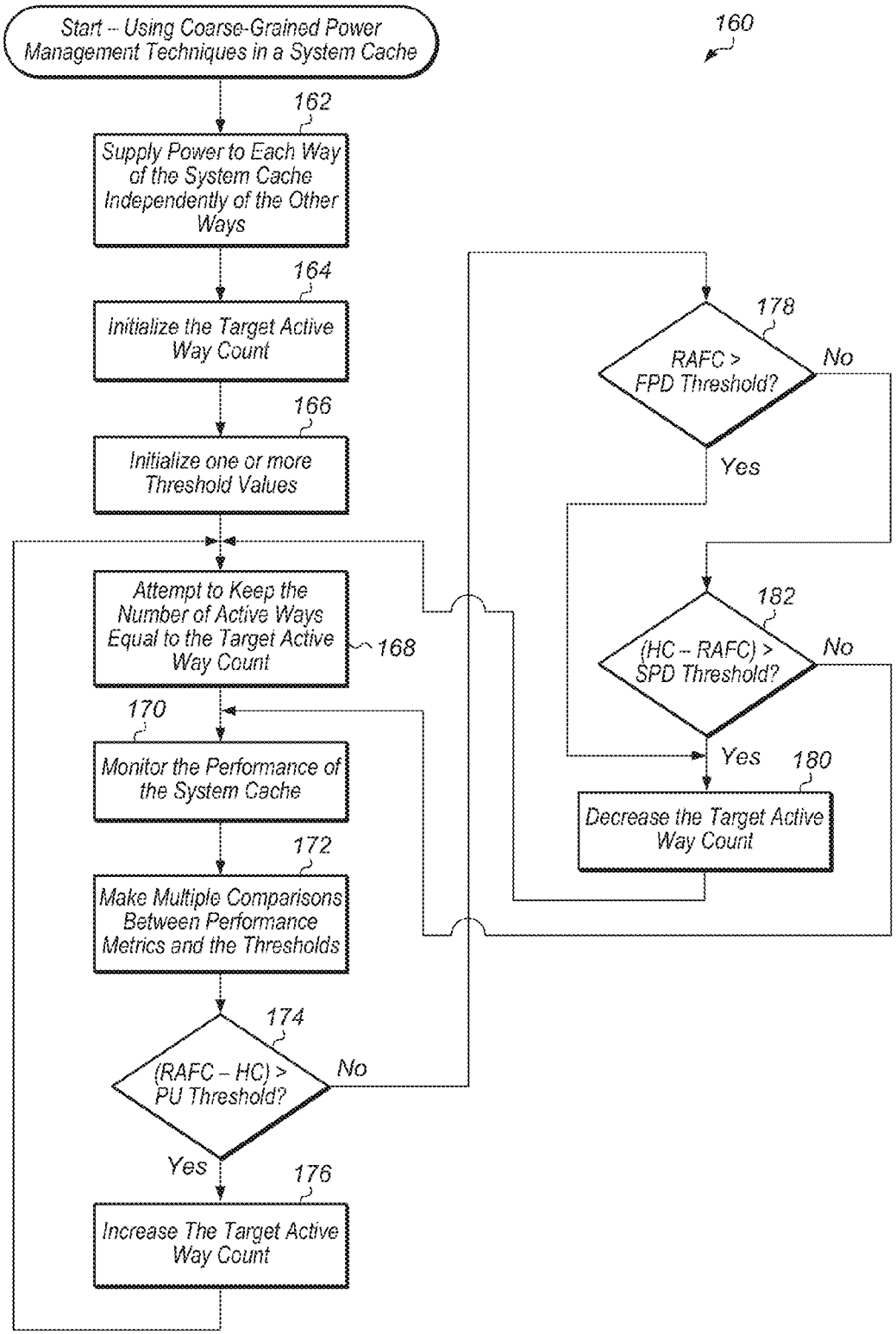
FIG. 8 is a generalized flow diagram illustrating one embodiment of a method for using coarse-grained power management techniques in a system cache.

Referring now to FIG. 8, one embodiment of a method 160 for using coarse-grained power management techniques in a system cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, power may be supplied to each way of a system cache independently of the other ways (block 162). In one embodiment, the system cache may have a multi-way set associative configuration. Also, the system cache may include a cache control unit with logic for managing power at a coarse-grained level. Next, the target active way count may be initialized (block 164). Also, one or more programmable threshold values associated with the system cache may be initialized (block 166). In one embodiment, the threshold values may include a power-up threshold and first and second power-down thresholds. In other embodiments, other numbers and types of threshold values may be utilized. It is noted that in other embodiments, block 166 may be performed prior to or simultaneously with block 164. Also, it is noted that the threshold values may be changed at any time via software while the various steps of method 160 are being performed.

Next, the system cache may attempt to keep the number of ways of the system cache that are active equal to the target active way count (block 168). In one embodiment, this may entail adjusting the number of active ways to match the value of a target active way count value. In one embodiment, a current way count register may be maintained by the cache control unit, and the current way count register may be read to determine how many ways are currently active. In this embodiment, the cache control unit may compare the value of the current way count register to the value of a target active way count register. If the number of active ways does not equal the target active way count value, then one or more active ways may be powered down or one or more inactive ways may be powered up to make the values match.

Next, the cache control unit may monitor the performance of the system cache (block 170). While monitoring the performance of the system cache, the cache control unit may calculate one or more metrics based on the performance. In one embodiment, these metrics may include a replacement and allocation failure count and a hit count. The replacement and allocation failure count tracks the number of replacement and allocation failures for received requests over a given length of time. The given length of time may be programmable and may vary depending on the embodiment. In other words, a running average of the replacement and allocation failure count may be maintained. The hit count tracks the number of hits to the system cache over a given length of time. In other embodiments, other metrics relevant to the operation of the system cache may be tracked by the cache control unit.

Next, multiple comparisons may be made between the metrics and the thresholds (block 172). The number and type of comparisons that are made may be dependent on the number of metrics and thresholds and may vary from embodiment to embodiment. In one embodiment, one of the comparisons may include determining if the replacement and allocation failure count (RAFC) is greater than the hit count (HC) by more than a power-up threshold (conditional block 174). If the replacement and allocation failure count is greater than the hit count by more than a power-up threshold (conditional block 174, "yes" leg), then the target active way count may be increased (block 176). After block 176, method 160 may return to block 168 and adjust the number of active ways to match the target active way count, if these two values are not equal. Alternatively, in another embodiment, method 160 may go to conditional block 178 after block 176 to continue checking the results of the other comparisons. If the replacement and allocation failure count is not greater than the hit count by more than a power-up threshold (conditional block 174, "no" leg), then the cache control unit may determine if the replacement and allocation failure count is greater than a first power-down threshold (conditional block 178).

If the replacement and allocation failure count is greater than a first power-down threshold (conditional block 178, "yes" leg), then the target active way count may be decreased (block 180). After block 180, method 160 may return to block 168 and adjust the number of active ways to match the target active way count, if these two values are not equal. If the replacement and allocation failure count is not greater than a first power-down threshold (conditional block 178, "no" leg), then the cache control unit may determine if the hit count is greater than the replacement and allocation failure count by more than a second power-down threshold (conditional block 182).

If the hit count is greater than the replacement and allocation failure count by more than a second power-down threshold (conditional block 182, "yes" leg), then the target active way count may be decreased (block 180). If the replacement and allocation failure count is not greater than a first power-down threshold (conditional block 178, "no" leg), then method 160 may return to block 170 and calculate one or more metrics based on the performance of the system cache.

It is noted that although conditional blocks 174, 178, and 182 are shown as being steps within method 160, one or two of these steps may be excluded from other methods. For example, in another embodiment, only conditional blocks 174 and 178 may be utilized for determining whether to increase or decrease the target number of active ways, respectively. Alternatively, in a further embodiment, one or more of conditional blocks 174, 178, and 182 may be used with one or more other determining conditions not shown in FIG. 8. Other variations of numbers and types of determining conditions for increasing or decreasing the target number of active ways are possible and are contemplated.

Figure 9:
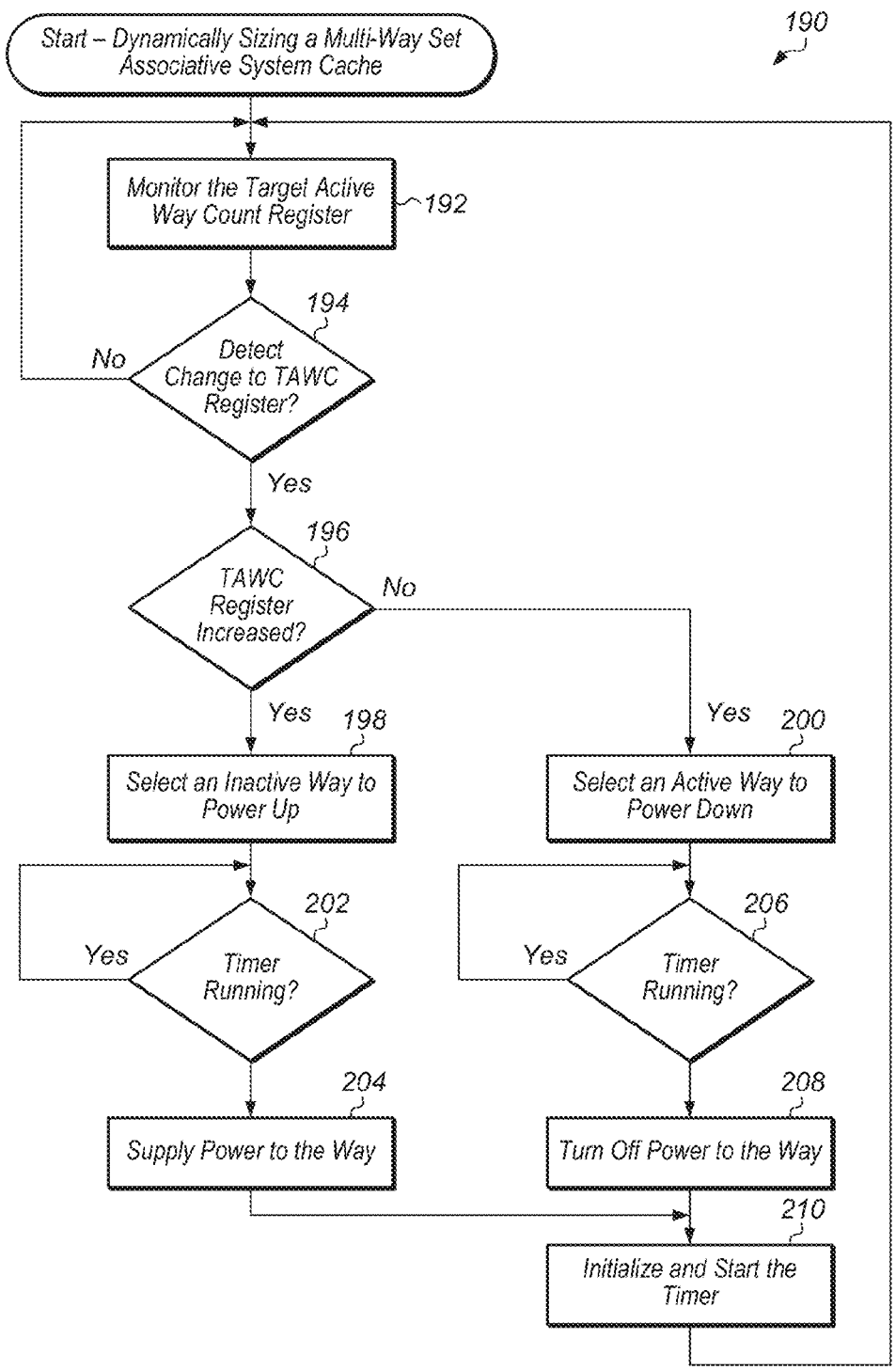
FIG. 9 is a generalized flow diagram illustrating one embodiment of a method for dynamically sizing a multi-way set associative system cache.

Referring now to FIG. 9, one embodiment of a method 190 for dynamically sizing a multi-way set associative system cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a cache control unit of a system cache may monitor the target active way count register (block 192). The target active way count register may store the target active way count value, which specifies how many ways of the multi-way system cache the cache control unit should keep active. If the cache control unit detects a change to the target active way count (TAWC) register (conditional block 194, "yes" leg), then the cache control unit may determine if the target active way count has increased or decreased (conditional block 196). If the cache control unit does not detect a change to the target active way count register (conditional block 194, "yes" leg), then method 190 may return to block 192 to continue monitoring the target active way count register.

If the target active way count has increased (conditional block 196, "yes" leg), then the cache control unit may select an inactive way to power up (block 198). If the target active way count has decreased (conditional block 196, "no" leg), then the cache control unit may select an active way to power down (block 200). In one embodiment, there may be a cache access counter for each way, and the cache control unit may pick the least accessed way to power down, with the least accessed way determined by the lowest cache access counter value. Each cache access counter may count requests that hit or are allocated in the corresponding way. In one embodiment, requests that replace existing cache lines in the system cache may not be counted by the cache access counters.

The cache control unit may include a timer that is started after a way of the system cache is activated or deactivated. After block 198, if the timer is running and the timer was started by an active way being powered down (conditional block 202, "yes" leg), then method 190 may return to block 198 to wait until the timer expires. If the timer is not running or if the timer is running and was started by an inactive way being powered up (conditional block 202, "no" leg), then the cache control unit may supply power to the way selected in block 198 (block 204). Next, the cache control unit may initialize and start the timer (block 210). The timer may run for a predetermined amount of time until it expires. While the timer is running, the cache control unit may prevent any active ways from being powered down. Also, in one embodiment, when a way is powered-up, the corresponding cache access counter may be reset. After block 210, method 190 may return to block 192 to monitor the target active way count register.

After block 200, if the timer is running and the timer was started by an inactive way being powered up (conditional block 206, "yes" leg), then method 190 may return to block 206 to wait until the timer expires. If the timer is not running or if the timer is running and was started by an active way being powered down (conditional block 206, "no" leg), then the cache control unit may turn off power to the way selected in block 200 (block 208). Next, the cache control unit may initialize and start the timer (block 210). After block 210, method 190 may return to block 192 to monitor the target active way count register.

Figure 10:
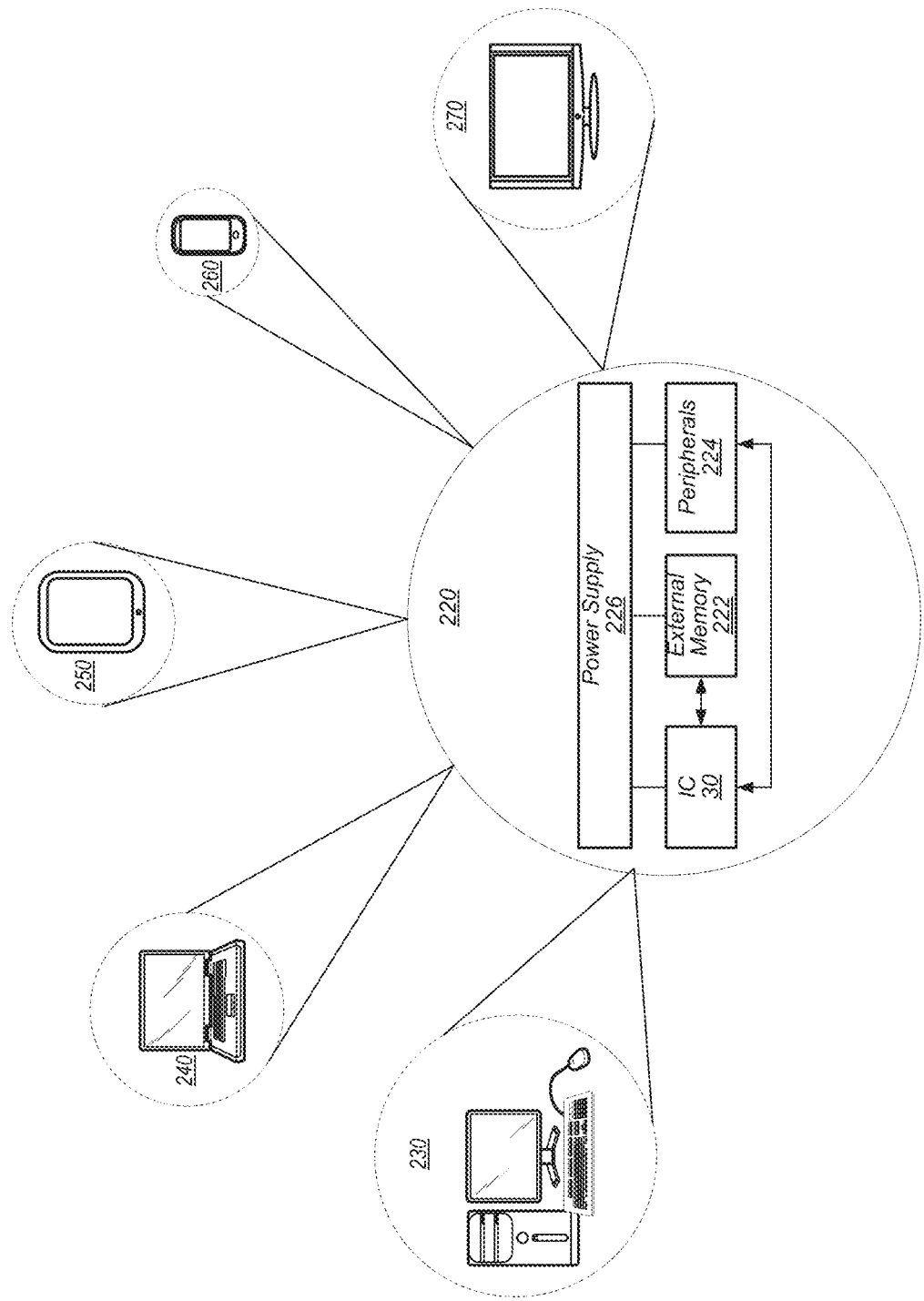
FIG. 10 is a block diagram of one embodiment of a system.

Referring next to FIG. 10, a block diagram of one embodiment of a system 220 is shown. As shown, system 220 may represent chip, circuitry, components, etc., of a desktop computer 230, laptop computer 240, tablet computer 250, cell phone 260, television 270 (or set top box configured to be coupled to a television), or otherwise. Other devices are possible and are contemplated. In the illustrated embodiment, the system 220 includes at least one instance of IC 30 (of FIG. 2) coupled to an external memory 222.

IC 30 is coupled to one or more peripherals 224 and the external memory 222. A power supply 226 is also provided which supplies the supply voltages to IC 30 as well as one or more supply voltages to the memory 222 and/or the peripherals 224. In various embodiments, power supply 226 may represent a battery (e.g., a rechargeable battery in a smart phone, laptop or tablet computer). In some embodiments, more than one instance of IC 30 may be included (and more than one external memory 222 may be included as well).

The memory 222 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multichip module configuration.

The peripherals 224 may include any desired circuitry, depending on the type of system 220. For example, in one embodiment, peripherals 224 may include devices for various types of wireless communication, such as wifi, Bluetooth, cellular, global positioning system, etc. The peripherals 224 may also include additional storage, including RAM storage, solid state storage, or disk storage. The peripherals 224 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A cache comprising:
a cache memory arranged as a set associative memory having a plurality of ways; and
a cache control unit coupled to the cache memory, wherein the cache control unit is configured to:
manage power to the plurality of ways by dynamically enabling and disabling ways of the plurality of ways;
calculate a replacement and allocation failure count for the cache memory, wherein the replacement and allocation failure count tracks a number of requests that replace existing cache lines or fail to allocate in the cache memory over a first predetermined amount of time; and
decrease the number of active ways responsive to determining the replacement and allocation failure count is less than a first threshold.

2. The cache as recited in claim 1, wherein the cache control unit is further configured to search for an active way to power down responsive to determining the replacement and allocation failure count is less than the first threshold.

3. The cache as recited in claim 2, wherein the cache control unit is further configured to select a first way to power down responsive to determining the first way is an active way with a lowest number of recent accesses.

4. The cache as recited in claim 3, wherein the cache control unit is further configured to start a timer responsive to powering down the first way.

5. The cache as recited in claim 4, wherein the cache control unit is further configured to prevent any inactive way from being powered up until the timer expires.

6. The cache as recited in claim 1, wherein the cache control unit is further configured to:
calculate a hit count for the cache memory, wherein the hit count tracks a number of requests that hit existing cache lines in the cache memory over a second predetermined amount of time; and
decrease the number of active ways responsive to determining the hit count is greater than the replacement and allocation failure count by more than a second threshold.

7. The cache as recited in claim 6, wherein the first predetermined amount of time is equal to the second predetermined amount of time.

8. A method comprising:
managing power independently for each way of a multiway system cache;
maintaining a target active way count, wherein the target active way count specifies a desired number of active ways;
tracking a number of currently active ways;
adjusting the number of currently active ways to match the target active way count;

selecting an inactive way to power up responsive to determining the number of currently active ways is less than the target active way count;

starting a timer responsive to powering up a given way; and preventing any active way from being powered down until the timer has expired.

9. The method as recited in claim 8, further comprising reducing the target active way count responsive to determining an average number of hits is greater than an average number of replacements and allocation failures by more than a first threshold.

10. The method as recited in claim 9, further comprising selecting an active way to power down responsive to determining the number of currently active ways is greater than the target active way count.

11. The method as recited in claim 10, further comprising:

powering down a first way responsive to determining the number of currently active ways is greater than the target active way count;

starting the timer responsive to powering down the first way; and preventing any inactive way from being powered up until the timer has expired.

12. The method as recited in claim 8, further comprising reducing the target active way count responsive to detecting an average number of replacements and allocation failures is greater than a second threshold.

13. The method as recited in claim 8, further comprising increasing the target active way count responsive to detecting an average number of replacements and allocation failures is greater than an average number of hits by more than a third threshold.

14. The method as recited in claim 8, wherein the system cache comprises a cache control unit, and wherein the cache control unit tracks the number of currently active ways using a current active way count register.

15. A memory controller comprising a system cache, wherein the system cache comprises:

a multi-way data memory configured to store a plurality of cache lines;

a multi-way tag memory configured to store a plurality of tags corresponding to the plurality of cache lines; and a cache control unit configured to:

supply power to each way of the multi-way data memory, wherein each way is powered individually;

reduce a number of active ways responsive to determining an average replacement and allocation failure count is less than a first threshold.

16. The memory controller as recited in claim 15, wherein the cache control unit is further configured to supply power to each way of the multi-way tag memory, wherein each way is powered individually.

17. The memory controller as recited in claim 16, wherein each way of the multi-way tag memory corresponds to a respective way of the multi-way data memory.

18. The memory controller as recited in claim 17, wherein reducing the number of active ways comprises disabling power to one or more ways of the multi-way data memory and to one or more corresponding ways of the multi-way tag memory.

19. The memory controller as recited in claim 18, wherein the cache control unit is configured to select one or more ways with lowest access counts for disabling power.

20. The memory controller as recited in claim 19, wherein the cache control unit is further configured to reset an access count of a given way responsive to enabling power to the given way.

* * * * *